Aug. 8, 1939.   H. C. EDWARDS   2,168,839
FUEL INJECTOR
Filed April 3, 1937

INVENTOR:
Herbert C. Edwards
BY Carr Harr & Gravely,
his attorneys.

Patented Aug. 8, 1939

2,168,839

UNITED STATES PATENT OFFICE 2,168,839

FUEL INJECTOR

Herbert C. Edwards, Massillon, Ohio, assignor to The Timken Roller Bearing Company, Canton, Ohio, a corporation of Ohio Application April 3, 1937, Serial No. 134,788

3 Claims. (Cl. 299—107.6)

This invention relates to fuel injectors, particularly spring-loaded hydraulically operated injectors for compression-ignition oil engines.

It has for its principal objects to provide the injector with a simple and efficient valve loading device, to provide for economy and durability of construction and to obtain other advantages hereinafter appearing. The invention consists in the fuel injector and in the construction, combinations and arrangements of parts hereinafter described and claimed.

Figure 1:
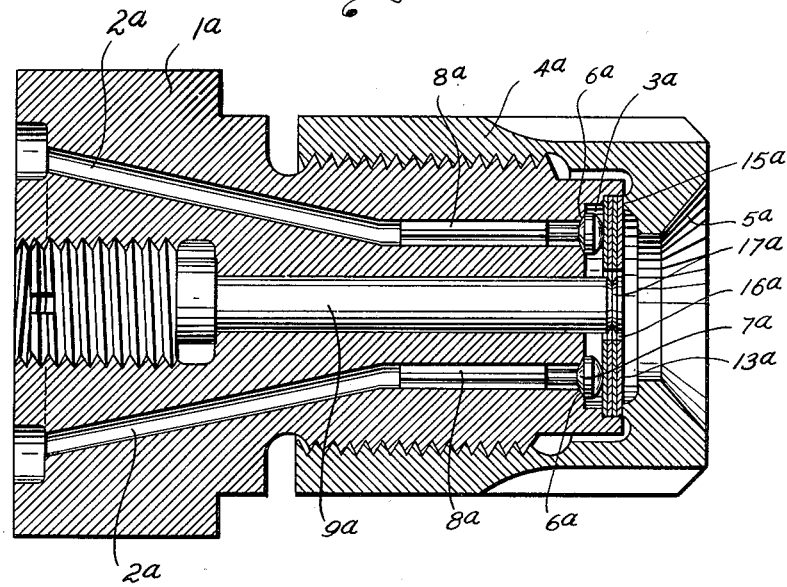
Figure 2:
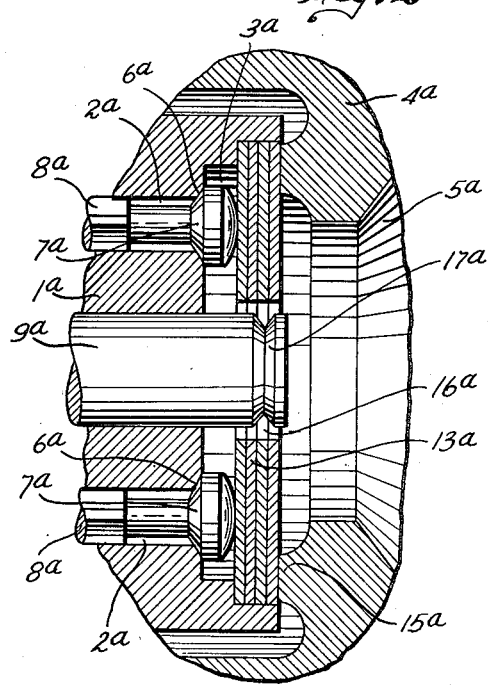

In the accompanying drawing, which forms part of this specification and wherein like symbols refer to like parts wherever they occur, Fig. 1 is a central longitudinal section through a fuel injector embodying my invention; and Fig. 2 is a similar section on an enlarged scale through the outer or delivery end portion of said nozzle.

The fuel injector shown in the accompanying drawing comprises a cylindrical nozzle member 1a having a plurality of longitudinal circumferentially spaced fuel passageways 2a that open into a central circular recess 3a provided therefor in the outer end of the nozzle. The discharge ends of these passageways are flared to provide conical valve seats 6a; and conical valves 7a cooperate with these seats and have fluted stems 8a slidably supported in said passageways. These valves are yieldably held against their seats by means of a plurality of resilient, superimposed annular disks 13a whose outer margins are rigidly clamped to the nozzle by means of an annular rib 15a on a nozzle cap 4a which is threaded on said nozzle and is provided with a relatively large discharge opening 5a.

The nozzle is provided with an axial bore having a pin 9a secured therein that terminates in the openings in the annular disks 13a and is provided adjacent to its end with an annular groove 17a. Clearance is provided between the nozzle pin and the openings in the annular disks to form an annular fuel discharge orifice 16a therebetween.

By the arrangement described, when the pressure of the fuel in the passageways 2a is raised sufficiently to deflect the resilient valve closing or loading disks 13a, the valves 7a are forced off their seats 6a, thereby permitting the fuel to flow into the circular recess 3a in the end of the nozzle and thence through the annular orifice 16a between the fixed nozzle pin 9a and the openings in said disks and thence through the discharge opening 5a in the nozzle cap 4a. The stiffness of the disks determines the valve opening pressure; and the spray angle and rate of fuel discharge may be controlled by the shape of the groove 17a in said nozzle pin.

What I claim is:

1. A fuel injector comprising a nozzle having a plurality of circumferentially spaced fuel passageways opening through the outer end thereof, valves for closing the discharge ends of the respective passageways, a cap for said end of said nozzle having an axial opening therein, a plurality of superimposed resilient annular disks having their outer marginal portions rigidly clamped to said nozzle by said cap and their remaining portions left free and bearing against said valves, and a pin rigid with and projecting axially from the outer end of said nozzle and extending into the openings in said annular disks with an annular clearance space therebetween.

2. A fuel injector comprising a nozzle having a fuel passageway whose discharge end opens through the outer end of said nozzle non-axially thereof, a valve for closing the discharge end of said passageway, means for yieldably holding said valve in closed position, said means comprising a resilient annular disk having its outer marginal portion rigidly secured to the outer end of said nozzle and its remaining portion left free and bearing against said valve, and a pin rigid with and projecting axially from said outer end of said nozzle into the opening in said annular disk with an annular space therebetween for the passage of fuel.

3. A fuel injector comprising a nozzle having a fuel passageway whose discharge end opens through the outer end of said nozzle non-axially thereof, a valve for closing the discharge end of said passageway, means for yieldably holding said valve in closed position, said means comprising a resilient annular disk having its outer marginal portion rigidly secured to the outer end of said nozzle and its remaining portion left free and bearing against said valve, a pin rigid with and projecting axially from said outer end of said nozzle into the opening in said annular disk with an annular space therebetween for the passage of fuel, said pin having a peripheral groove formed therein adjacent to said opening, and means for adjusting said pin axially of said opening.

HERBERT C. EDWARDS.